Figure 11:
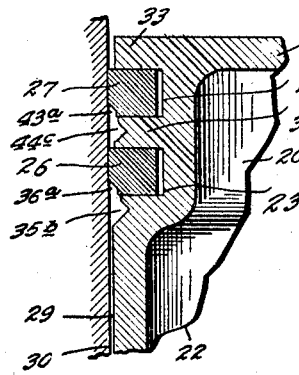

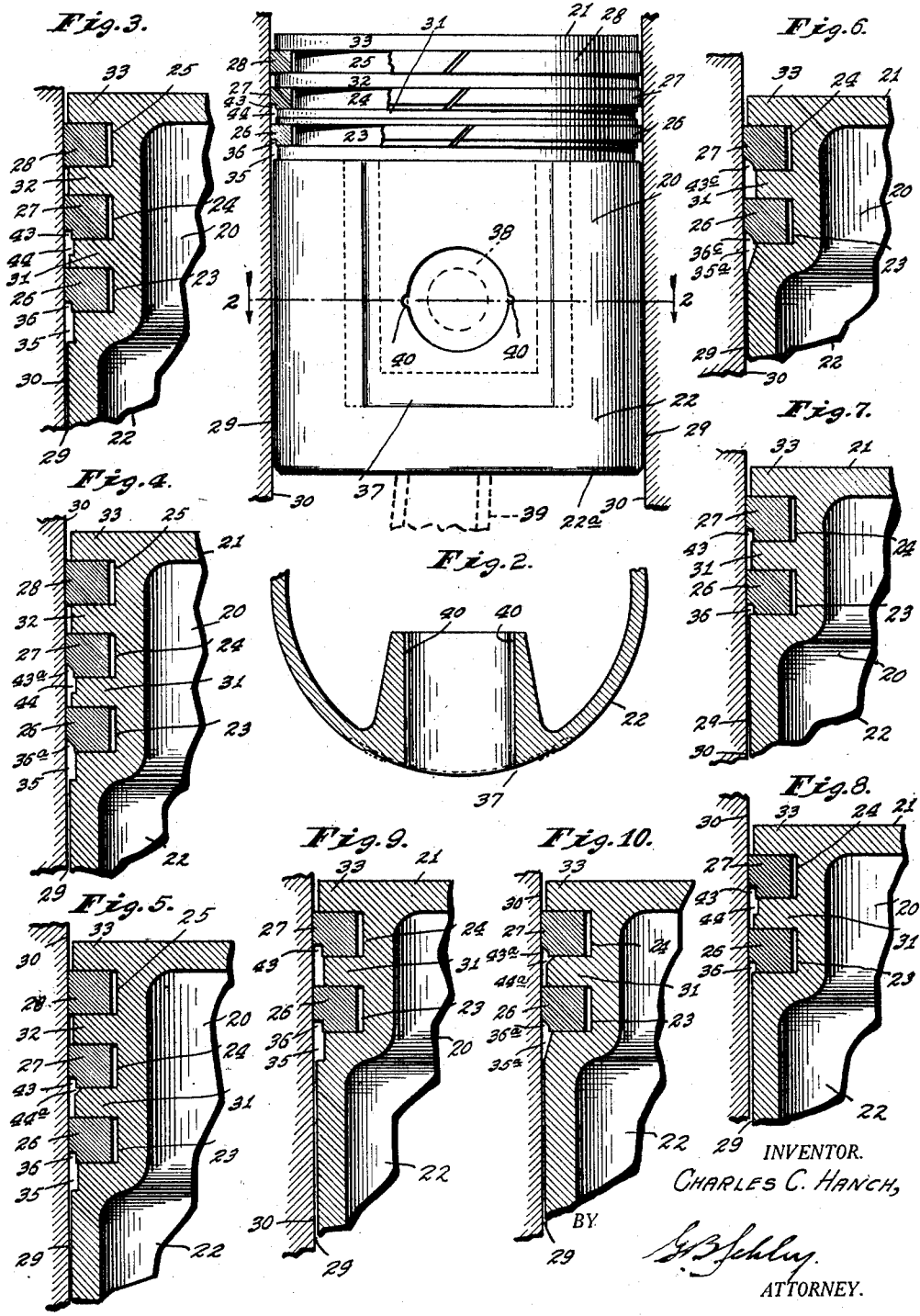

April 24, 1928. 1,667,548
C. C. HANCH
PISTON
Filed Jan. 5, 1924   2 Sheets-Sheet 2

INVENTOR.
CHARLES C. HANCH,
BY
ATTORNEY.

Patented Apr. 24, 1928.

1,667,548

UNITED STATES PATENT OFFICE.

CHARLES C. HANCH, OF INDIANAPOLIS, INDIANA.

PISTON.

Application filed January 5, 1924. Serial No. 684,639.

Owing to the fact that pistons of internal combustion engines are the parts subjected to heaviest duty, there has always been more or less trouble and frequently great trouble with such pistons, resulting in "oil pumping", "piston slaps", "blow by", "crank-case dilution", ineffective and/or unequal compression, loss of power, chafing or galling, with the resultant scoring of pistons and cylinder walls.

"Oil pumping" results from an excess quantity of oil passing the piston into the combustion chamber, which results in an excessive consumption of oil, fouling of spark plugs, coating of carbon on valves, piston heads, and combustion chamber, and smoky and clogged exhaust from the muffler.

"Piston slaps" usually result from too great clearance between the piston and the cylinder wall, untrue or distorted pistons, and lack of efficient lubrication between the piston and the cylinder wall.

"Blow by" usually results from defective piston rings, improper fitting of such rings, improper design of such rings, improper design of pistons, undesirable openings in the walls of pistons, irregularities of the cylinder bore, and lack of efficient lubrication between the piston and cylinder wall, all of which causes ineffective and/or unequal compression, unequal power impulses, loss of power, and "crank-case dilution" and/or contamination; the last being the result of the passage between the piston and the cylinder wall of condensation and unburned fuel from the combustion chamber, into the oil supply at the bottom of the crank case.

Scoring of cylinders and pistons, as a result of chafing or galling, is usually caused by distorted pistons or cylinder walls, expansion of pistons which are fitted without sufficient clearance in the cylinders, or lack of efficient lubrication between the piston and the cylinder wall.

It has been necessary heretofore to make pistons with great accuracy, with exactly the proper clearance as nearly as that could be determined as a compromise between the too great clearance which produced slapping and usually produced "blow by" and oil pumping, and the too little clearance which resulted in the scoring of the piston and cylinder wall by the chafing of the piston against the cylinder. This compromise was never a cure as it merely lessened one evil at the expense of increasing another. Manufacturers of internal combustion engines have heretofore been compelled to work constantly "between a slap and a score".

Engines assembled according to usual practice are frequently seriously damaged during block test and must be driven with great care for a considerable distance to prevent serious injury. Even if they are broken in without damage, after a comparatively few thousand miles of use, they develop "piston slaps" and other troubles as a result of slight wear, necessitating replacing the pistons and rings, regrinding of cylinders, or both.

In fact, prior to my invention so-called "excessive" clearance of the piston was considered an evil to be avoided. I have now discovered how to take advantage of large clearance and produce a piston which will not pump oil, slap, score, or permit "blow by" with the resultant crank-case dilution, and loss of compression and power.

It is an object of this invention to provide a piston for internal combustion engines so designed that it will float in oil in its operation with relatively large clearance, and without slapping, oil pumping or "blow by". More specifically the object of the invention is to provide such a piston which will operate successfully without slapping and "blow by", with more clearance than is usually permissible; which will give maximum lubrication between the piston and the cylinder wall substantially throughout the length of the piston and without permitting an excessive quantity of oil to pass the piston into the combustion chamber; which will provide an effective oil seal to prevent "blow by" and at the same time provide proper relief for excessive oil pressure created by the scraping or packing action of the piston rings on the downward stroke (away from the cylinder head) of the piston; and which will provide an ample oil supply for lubricating the cylinder wall on the upward stroke and for effectively lubricating the wrist pin; the accomplishment of these objects providing a piston assembly of unusually long life.

The clearance between the piston and the cylinder wall, either normal or "excessive" is only a few thousandths of an inch. The distance from the bottom ring at the head of the piston to the bottom of the skirt, however, is usually a matter of several inches. Thus the annular clearance space is thousands of times as long as it is wide or thick. Assuming that this space has within it a quantity of lubricating oil and the piston is about to commence its downward stroke (away from the cylinder head), the piston ring or rings are required to shave this film of oil off the wall of the cylinder, or at least all of it except a very much thinner film which remaining lessens wear of the cylinder wall and the rings engaging it. Since this remaining film appears on the wall of the combustion chamber as the piston descends, it should be kept at a minimum; otherwise it will tend to cause carbonization and its attendant evils.

In the ordinary close-fitting piston the oil thus shaved off accumulates in the clearance space below the rings and has but one theoretical source of escape; it must flow down the clearance space moving along the surface of the cylinder wall because of the motion of the piston. As a matter of hydraulics it can readily be seen that the oil pressure below the bottommost piston ring rises to a very high point, due in part to the pressure required to move the oil down through the long narrow or thin clearance space, and in part to the inertia of the oil because at the start of the downward stroke the oil is at rest. This high pressure tends to lift the piston ring (that is, to cause it to back radially away from the cylinder wall,) and such lifting allows an excessive quantity of oil to flow past the piston ring or rings into the combustion chamber. As a matter of fact when the ordinary piston is normally expanded by heat, the top part of the skirt, the lands between rings, and the outer face of the rings form a substantially unbroken straight line which readily permits passage of an excess quantity of oil into the combustion chamber, and of fluids from the combustion chamber into the crank case.

I am aware that attempts have been made to cure this evil by forming a groove below a piston ring with relatively large ports from this groove or from the piston-ring groove itself to the interior of the piston. In so far as relieving the high pressure of the oil and tending to prevent excessive quantity of oil from getting by the rings into the combustion chamber, such an arrangement works with some degree of success; but it still requires a close clearance (to prevent piston slap) with its attendant evils, because this arrangement scrapes off and allows the free escape of a certain amount of oil adhering to the cylinder walls. Such an arrangement while preventing to some extent an excessive quantity of oil from getting by the rings into the combustion chamber, at the same time reduces the effective packing action of the rings and permits "blow by" with the consequent crank-case dilution and loss of compression and power.

In carrying out my invention I provide a plurality of piston rings at the head end of the piston and preferably allow the oil to pass freely upward along the side of the piston in the clearance space between it and the cylinder wall until the oil encounters a piston ring at or near the piston head, so that there is a freely supplied film of oil between the cylinder wall and the piston throughout the greater part of its length; this clearance space may be, and preferably is, relatively wide or thick. At the lower side of the lowermost piston ring, that is to say, at the side of the piston ring which is remote from the piston head, I provide a circumferential channel, groove, or passageway, either in the wall of the piston or in the piston ring or in both, for carrying the oil circumferentially; and I provide a reservoir into which this circumferential channel, groove, or passageway leads. The length of circumferential travel of the oil in this channel, groove or passageway can be varied by making the upper portion of the reservoir wider or narrower as may be required, thereby controlling the flow of the oil to any desired degree. The flow and pressure of the oil in the circumferential channel, groove or passageway, and in the reservoir may also be varied and controlled by varying the capacity of the reservoir by making it wider, longer, or deeper or vice versa, resulting in ability to meter the oil which passes the piston rings into the combustion chamber. This reservoir is preferably a depression in the outer surface of the piston opposite or around or in the neighborhood of the end of the wrist-pin, and includes and makes use of the usual depression at the end of the wrist-pin, and the hole in the wrist-pin if the latter be hollow. The reservoir in turn has one or more pressure-relief passages (which should provide more than mere capillary relief) which preferably lead to the bearing surfaces of the wrist-pin; but when these pressure-relief passages are properly proportioned to maintain suitable oil pressure in the reservoir and grooves, it is not essential that the pressure-relief passages lead to the bearing surface of the wrist-pin.

There is also provided between two piston rings near the piston head an ample clearance, (that is to say, more clearance than is required for expansion,) forming a circumferential oil reservoir or pocket, which may be either in the piston itself or in the piston ring or in both. When the circumferential channel, groove or passageway, or oil reservoir or pocket between rings, is wholly or partially in a piston ring, the oil-controlling ability of the aforesaid parts may be varied by changing the angularity of the contact of the cylinder wall and that cylinder-engaging piston-ring corner which is remote from the piston head.

By this arrangement or any suitable combination of the elements thereof I am able to float the large-clearance piston on a substantially unbroken film of oil and yet to prevent excessive lubrication of the combustion chamber, and thus to prevent or minimize carbonization on the piston head, combustion chamber and valves, fouling of the spark plugs, and the like. In my arrangement the piston on its downward stroke, due to its large clearance, has its skirt floating on the cylinder wall in a substantial film of oil. As the piston descends, all but the necessary minimum portion of this film is shaved off by a piston ring or rings. The oil thus shaved off accumulates in the circumferential channel, groove or passageway, and the reservoir or pocket between rings, under multiple-stage control; but the pressure does not build up excessively because the oil flows through the circumferential channel, groove or passageway into the reservoir, while the restraining upper portion of the reservoir (the restraining action of which may be either physical or hydraulic or both) and the pressure-relief groove or outlet prevent emptying of the circumferential channel, groove or passageway so that it holds oil for lubricating the return stroke of the piston. If this reservoir in its turn had no restraining opening or pressure-relief outlet, it would only be a matter of so many strokes until the reservoir was filled up and excessive pressure would develop; but as the reservoir in turn has relief, the oil cannot rise to objectionable pressures. I believe it is desirable to have the opening for the pressure relief from this reservoir at a point lower than the bottommost piston ring, assuming the piston is operated in the usual position; otherwise the oil forced into the reservoir from the circumferential channel, groove, or passageway will have a tendency to escape immediately because of its inertia and the speed of the descending piston and may not accumulate in the reservoir. At the same time the pressure-relief from the reservoir preferably should be at a point remote from its lower end assuming the piston is in its usual position, or the relief at that point must be a restraining one; otherwise the oil in the reservoir will escape in a nonuseful direction. However, the location of the pressure relief outlet may be varied if properly designed so as to relieve pressure only and not dump the contents of the circumferential channel, groove or passageway, and/or of the reservoir. When the circumferential channel, groove or passageway, reservoir, and pressure-relief outlet are properly arranged in accordance with my invention, on the up-stroke of the piston the oil in the circumferential channel, groove, or passageway and/or in the reservoir will return to the clearance space, thus maintaining the oil film upon which the piston floats.

When aluminum or other light metals or alloys are used in the construction of pistons it has been found in some cases that owing to the excessive expansion of such metals from heat it is desirable to provide a yielding place in the skirt of the piston. This yielding place is quite commonly provided by slotting the skirt of the piston, frequently in the form of the letter T; but my invention is not limited to this construction of such yielding places. I have found that by providing a dam between such slots and the circumferential channel, groove or passageway, and the reservoir such slotted pistons function substantially the same as other pistons described in this invention.

My invention comprises variable means for preserving the film of oil between the piston and the cylinder wall, variable means for removing a portion of this oil on the down-stroke so that the film which will appear in the combustion chamber is not of undue thickness, variable means for preserving at least a substantial portion of the removed oil upon or within the piston so that it is returned to the clearance space upon the return stroke, and variable means for substantially retaining a relatively large amount of oil between piston rings thus carrying copious lubrication very near to the top of the piston without permitting the passage of an undue amount of oil into the combustion chamber, or passage of gases or unburned fuel into the crank case, means for packing with lubricant under pressure between and below piston rings so as to exert effective pressure on plane faces of such rings thereby cushioning the movement of the ring within its respective groove, prolonging its life and increasing its sealing qualities.

My present invention is to some extent a development and improvement on that shown in my co-pending applications Serial No. 535,115, filed Feb. 7, 1922, and Serial No. 564,767, filed May 31, 1922, respectively.

Figure 12:
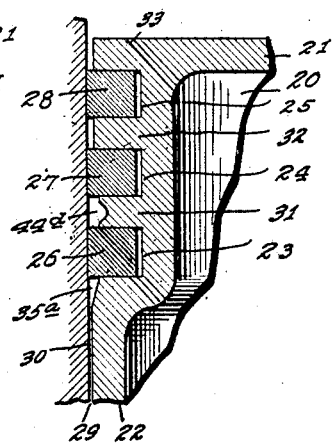
Figure 13:
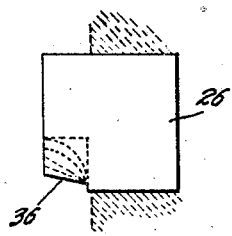
Figure 14:
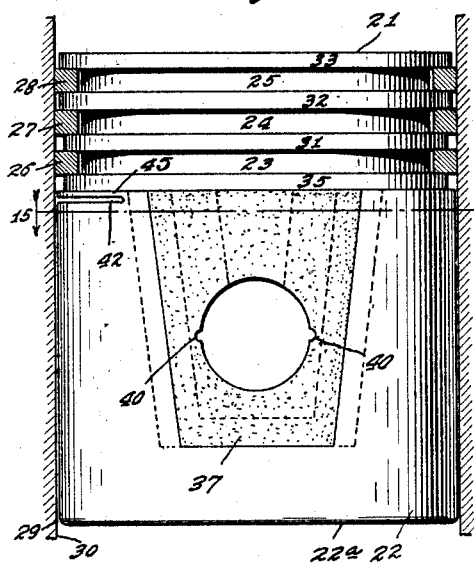
Figure 16:
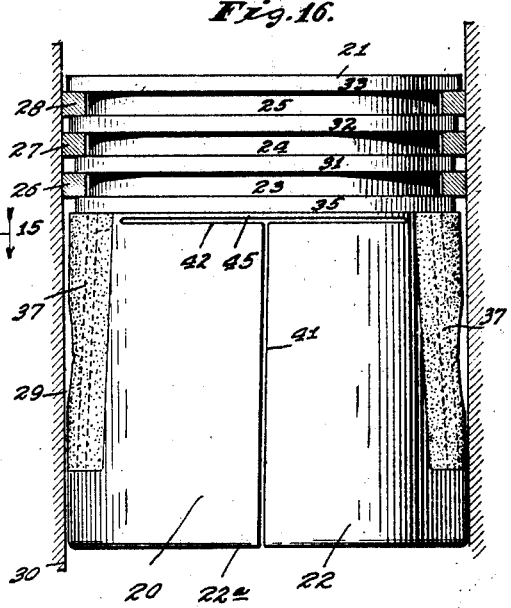
Figure 15:
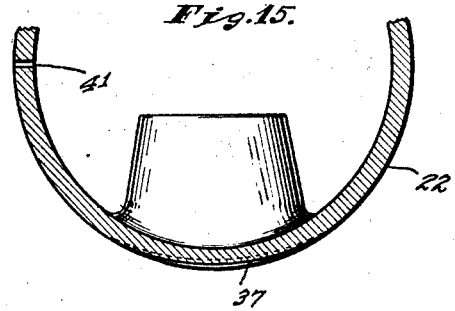

The accompanying drawings illustrate my invention: Fig. 1 is an elevation of a piston embodying my invention, looking at the end of the wrist-pin, with a fragment of the associated cylinder wall in section, and with the piston rings partially in section; Fig. 2 is a fragmental transverse section substantially on the line 2—2 of Fig. 1; Fig. 3 is an enlarged fragmental sectional detail of the upper left-hand corner of Fig. 1; Figs. 4 to 12 inclusive are fragmental views similar to Fig. 3, showing different constructions embodying my invention in various forms, the details of the ring and of the adjacent parts of the piston being different in the different views; Fig. 13 is an enlarged sectional view through a piston ring, showing variations which may be made in its oil-control groove or passageway at its cylinder-engaging corner remote from the piston head; Fig. 14 is a view similar to Fig. 1, showing a further modification of the oil-control passageways and reservoirs; Fig. 15 is a section substantially on the line 15—15 of Fig. 14; and Fig. 16 is a view of the piston of Fig. 14, taken from a viewpoint perpendicular to the wrist-pin, but with a slightly modified arrangement of lands between ring grooves, showing a piston with three plain rings.

The piston 20 is fundamentally a conventional piston, with a head 21 and a skirt 22; and it is provided at or near the head 21 with a plurality of piston ring grooves 23—24—25, shown as two in number in some of the figures and as three in number in some of the other figures. In the piston-ring grooves 23—24—25 are piston rings 26—27—28, which correspond in number with the piston-ring grooves. When there are only two piston rings, as in Figs. 6, 7, 8, 9, 10, and 11, I prefer that such two piston rings should be alike; while when there are three piston rings, such as in Figs. 1, 3, 4, 5, and 12, it is ordinarily desirable that the uppermost ring 28 be a plain ring, and that the two lower piston rings 26 and 27 should be alike; as it is commercially desirable to have no more than a single type of special piston ring in any engine, for convenience in manufacture and assembly.

There are no piston rings along the skirt 22, save at the top thereof where such skirt merges into the head 21; so that there is an unrestricted passageway 29 for the oil between the skirt 22 and the adjacent cylinder wall 30. This passageway 29 is the clearance space between the piston skirt and the cylinder wall, and is the clearance which it has heretofore been necessary to maintain within exceedingly close limits as a compromise, to prevent the evils mentioned above from becoming unduly great. Preferably the lower corner 22ª of the piston skirt 22 is chamfered, as indicated in Figs. 1, 14, and 16, to prevent such corner from scraping the oil from the cylinder wall, and to permit oil splashed from the crank-case onto the cylinder wall to enter freely into the clearance space 29, and to flow along such clearance space as far as the lower surface of the lower piston ring 26.

The piston-ring-grooves 23—24—25 are separated by lands 31—32, while above the entire group of piston rings there is a land 33. The land 32 is provided, of course, only when there are three piston rings. The lands 31—32—33 should all have sufficient clearance from the cylinder wall so that they never rub thereon even when the piston is hot or out of alinement; and should also all have greater clearance from the cylinder wall than does the skirt 22 of the piston. In other words, the clearance of these lands from the cylinder wall should always be greater than the clearance space 29. In addition, contrary to the usual practice of making these lands with equal clearance, or with greater clearance toward the top end of the piston or the combustion chamber, (ordinary expansion clearance in either case,) I may reverse this latter, and make a higher land with less clearance than that of a lower land; though the clearance of even the higher land or lands is greater than the clearance 29. This is indicated in Figs. 1, 3, 14, 16, and others. The intermediate land 32, when it is provided in a three-ring piston, may have an intermediate clearance between those of the lands 31 and 33, as is indicated in Fig. 16, or it may have the same clearance as one of the adjacent lands, as indicated in Fig. 14, where the intermediate land 32 has the same clearance as has the top land 33. Thus, contrary to the usual practice, a land farther from the combustion chamber may have a greater clearance than has a land closer to the combustion chamber; forming, as it were, a sort of inverted pyramid with respect to those lands. This "inverted-pyramid" effect may apply to only two lands or to more than two lands, as desired.

At the lower edge of the lowermost piston ring 26, there is a circumferential channel groove or passageway into which the clearance space 29 opens. This circumferential channel groove or passageway communicates with the lowermost piston-ring groove 23, as indicated in all the figures of the drawing; and it may take various forms, as shown in the different figures of the drawings, and may be formed either in the piston itself or in the lowermost piston-ring 26, or in both. Thus it may be formed partly or wholly by a circumferential rabbet 35 in the piston proper just below and in communication with the lowermost piston-ring groove 23, as indicated in Figs. 1, 3, 4, 5, 9, 14, and 16. Instead of a rabbet groove, it may take the form of a simple circumferential chamfer 35ª at that corner where the piston skirt leads into the lowermost piston-ring groove 23, as illustrated in Figs. 6, 10, and 12. The rabbet and the chamfer are probably the simplest forms, but if desired it may take various other forms such for example as the circumferential V-bottom groove 35ᵇ illustrated in Fig. 11. Similarly, if this circumferential channel, groove or passageway is formed partly or wholly in the lowermost ring 26, it may likewise take various forms in the lowermost outer corner of the piston ring. Thus it may be a circumferential rabbet groove 36 in that corner of such piston ring, as illustrated in Figs. 1, 3, 5, 7, 8, and 9. Or, if partly or wholly in the piston ring, it may take the form of a circumferential chamfer 36ª, preferably a set-back chamfer, as illustrated in Figs. 4, 10, and 11; or the form of a circumferential curved-bottom groove 36ᶜ, as illustrated in Fig. 6. This circumferential channel groove or passageway is illustrated in some of the figures as being formed partly in the piston and partly in the rings, as in Figs. 1, 3, 4, 5, 6, 9, 10, and 11; but it may be wholly in the ring 26, as illustrated in Figs. 7 and 8; or may be wholly in the piston in communication with the lowermost piston-ring groove 23, as illustrated in Figs. 12, 14, and 16. When the channel, groove or passageway is partly in the piston proper and partly in the piston ring 26, there is preferably a slight outward overhang of the piston ring 26 over the side wall of the groove 23, at their abutting faces, as is clear from Figs. 3, 4, 5, 6, 9, 10, and 11.

Various combinations of the different sets of groove-parts in the piston proper and in the piston ring 26 may be made, as illustrated in different figures of the drawing. These need no explanation, and are not all illustrated.

The channel, groove or passageway 35—36, in any of its modifications, communicates with an oil-reservoir 37, which is conveniently provided by a shallow depression in the outer face of the piston skirt opposite or around or in the vicinity of each end of the wrist-pin 38 by which the piston is connected to the usual connecting rod 39, and/or by the hole through the wrist-pin itself if such wrist-pin be hollow. The wrist-pin 38 may be of any suitable form, as explained in my aforesaid co-pending application. The two reservoirs are desirably at or in the vicinity of the two ends of the wrist-pin, and are shown at diametrically opposite points on the piston, and substantially at right angles to the plane of swing of the connecting rod 39 and to the component of lateral thrust which is exerted on the piston by the oblique reaction from the connecting rod.

The oil-reservoir 37 preferably extends well below the wrist-pin; and it has a restraining relief outlet, preferably at an intermediate point in its height, provided by oil grooves 40 which conveniently extend along the bearing surfaces of the wrist-pin. This reservoir-relief 40 serves not only the function of permitting some outflow of oil, so that undue pressure will not be accumulated, but the additional function of lubricating the wrist-pin by oil under forced-feed pressure.

The oil-reservoir 37 may take either the form of a concentric depression, as illustrated in Figs. 1 and 2, or the form of an eccentric depression, sometimes wider at the top than at the bottom, as indicated in Figs. 14, 15, and 16.

In either case, (that is, whether the depression forming the oil-reservoir is concentric or eccentric,) I may effectively govern the oil-control action of such reservoir by varying its width, height, and depth, as illustrated by the dotted lines of Figs. 1, 2, 14, 15, and 16. By making the reservoir wider and deeper, I provide an easier path for the oil to enter the reservoir from the circumferential groove, channel or passageway 35—36, and an easier passage to the oil-relief opening 40; and vice versa. By thus varying the dimensions of this oil-reservoir, I can govern the oil-control, and the passage of oil and other fluids past the piston rings, very effectively. This is one of the important features of my invention.

When the piston skirt is split, to provide for excessive expansion as in the case of aluminum pistons, as by a longitudinal slot 41 and a transverse slot 42 as illustrated in Fig. 16, I preferably provide a narrow dam 45, unsplit, above the transverse slot 42 and at each end thereof between the ends of such slot and the two reservoirs 37. This prevents the oil which is caught in the channel, groove or passageway 35—36 from being spilled out through the open slots 41 and 42.

In addition to the groove 35—36 below and in communication with the piston-ring groove 23, I preferably provide a circumferential reservoir or pocket in communication with the lower side of the next higher piston-ring groove 24. As with the groove 35—36, this second and higher circumferential reservoir or pocket may be partly or wholly in the ring 27 and partly or wholly in the land 31; but in any case, the land 31 preferably has a greater clearance than has either the land 33 or the piston skirt 22, and it may have a greater clearance than the land 32. That part of this second and higher circumferential reservoir or pocket which is in the ring 27, if any part thereof is in such ring 27, may take the same variations of form 43, 43ª, and 43ᶜ, as the grooves 36, 36ª and 36ᶜ in the lower outer corner of the ring 26; and thus needs no further description. That is, it may be a plain rabbet 43 (Figs. 1, 3, 5, 7, 8, and 9), or a chamfer 43ª (Figs. 4, 10, and 11), or a round-bottom groove 43ᶜ (Fig. 6). In any case, for commercial reasons, the groove or pocket in the lower outer corner of the ring 27 is preferably the same as the groove in the lower outer corner of the ring 26 in any single engine, so that the rings 26 and 27 will be alike; this makes for convenience and for the avoidance of mistakes, in manufacture and assembly as well as in repair.

That part of this second circumferential reservoir or pocket which is in the land 31 may likewise take various forms. It may be a simple rabbet groove, or pocket 44, extending circumferentially around the upper part of such land, as illustrated in Figs. 1, 3, 4, and 8; or it may take the form of a simple chamfer 44ª, as illustrated in Figs. 5 and 10; or it may take the form of a set-back V-bottom groove 44ᶜ, as indicated in Fig. 11; or it may take the form of a round-bottom groove 44ᵈ, as illustrated in Fig. 12, with the two sides of such groove, or at least the upper side, of sufficiently great clearance so that there is a free passage from such groove or pocket into the adjacent piston-ring groove 24. Various combinations of grooves or pockets in the land 31 and in the lower outer corner of the piston ring 27 may be used to form the second circumferential reservoir or pocket, as various figures of the drawing indicate. It is even possible and sometimes preferable to provide such circumferential reservoir or pocket merely by having the land 31 with sufficient clearance from the cylinder wall, as illustrated in Figs. 14 and 16, with the ring 27 a plain ring. In Fig. 14 the two lands 32 and 33 are shown as having the same clearance, while the land 31 is shown as having a greater clearance from the cylinder wall, and the same clearance as has the rabbet groove 35; while in Fig. 16, the lands 33, 32, and 31 have successively greater clearances from the cylinder wall.

In those pistons which have three piston rings at the top, as in Figs. 1, 3, 4, 5, 12, 14, and 16, I prefer that at least the top piston ring should be a plain piston ring, as all these figures indicate; but below that top plain piston ring I provide an oil-control arrangement or a plurality of oil-controls in lower piston rings and/or in the lands associated with the lower piston rings and/or in the piston below the lowermost piston ring, for preventing the various evils already referred to. I believe that this arrangement of a plain piston ring at the top of a three-ring piston, with an oil-control arrangement in a lower piston ring or the land associated therewith and a still lower piston ring whether or not with an associated oil-control, is new with me; and it is one of the features of my invention, both alone and in combination with other things.

In the same way that the variations in the length, depth, and height of the oil-reservoir 37 may be used to govern the oil-control, I may also similarly vary the shape and size of the oil-groove or pocket 36 or 43 in the rings 26 and 27 to effect a similar governing action, cumulative with the first if desired. I have illustrated this in Fig. 13, in connection with the piston ring 26; for the piston ring 27 and the piston ring 26 are preferably exactly alike in any one engine. Thus by the full and dotted lines at the lower outer corner of the piston ring 26 in Fig. 13, I have shown a number of different forms which the groove 36 may take, including the very slight-bevel set-back chamfer, set-back chamfers with greater bevels, round-bottom grooves of different curvature, and the simple rabbet. By these variations, I control the angle of the groove-face where its cylinder-engaging corner comes in contact with the cylinder wall, and thus govern the oil-control. This governing of the oil-control action of the rings 26 and 27 by this variation in the shape and size of the circumferential passageway or pocket in the lower outer corner of such ring is one of the important features of my invention.

In all cases where there is a part of the second circumferential reservoir or pocket in the land 31, just the same as when there is in the circumferential channel, groove or passageway 35 in the piston close to the piston-ring groove 23, the adjacent face of the piston ring above it preferable overhangs outward; as the various figures indicate. Preferably this is always the case save in those instances where there is no part of the circumferential groove or pocket in the land 31 or in the skirt.

The operation of the device is obvious from what has preceded. When the piston descends, the oil on the cylinder wall freely enters the clearance space 29 and moves upward therein relatively to the descending piston, and to a great extent is scraped off the cylinder wall 30 by the lowermost piston ring 26. This scraped-off oil is forced around the cylinder through the circumferential channel, groove or passageway 35—36 into the oil-reservoir 37, whence some of it escapes through the relief-passages 40. Such escape is enough to relieve any undue pressure; but not enough to empty either the reservoir 37 or the circumferential channel, groove or passageway 35—36. Therefore, sufficient oil is retained in these spaces, and in the clearance space 29, so that the piston floats on a film of oil. When the piston rises, this retained oil is fed back onto the surface of the cylinder wall, to a greater or less extent, thus maintaining the floating effect.

Some of the oil, however, is not scraped off by the lowermost piston ring 26, but passes by such ring. Most of this oil which passes by is scraped off by the next higher piston ring 27, and accumulates in the circumferential reservoir or pocket 43—44; whence a small part is fed to the cylinder wall as the piston moves.

Whatever may be the explanation, it is found that by this combination, and to a less extent by the different parts thereof separately, the evils above referred to are to a very great extent corrected. The amount of oil consumed by the engine is materially reduced. Yet the piston can operate with a large clearance, in comparison with that heretofore considered desirable or possible. The floating of the piston on the film of oil effectively prevents piston-slap; but yet neither the oil from below nor the fuel or gases from above pass the piston ring to any material extent.

I claim as my invention:—

1. An internal-combustion-engine piston having near its head-end a plurality of piston-ring grooves with rigid lands between said grooves and between the piston-end and the adjacent groove, said lands being directly exposed to the outside of the complete piston, and the piston-ring-engaging walls of said grooves being substantially perpendicular to the piston axis, a land nearer the piston-end being of larger diameter than a land farther from the piston-end.

2. An internal-combustion-engine piston having near its head-end a plurality of piston-ring grooves with rigid lands between said grooves and between the piston-end and the adjacent groove, said lands being directly exposed to the outside of the complete piston, and the piston-ring-engaging walls of said grooves being substantially perpendicular to the piston axis, a land between grooves being of smaller diameter than the land between the piston-end and the adjacent groove.

3. In combination, a piston having a plurality of piston-ring grooves near its head end and a rigid land between any two adjacent grooves, and a plurality of piston rings in said grooves; including a plain ring nearest the piston-end, and a plurality of piston-ring grooves for other piston rings, said piston and piston rings being arranged to provide circumferential oil channels on the ring-sides remote from the piston head and into which the respectively associated piston rings scrape oil, one such oil channel having free communication with piston-ring grooves on both sides of it.

4. In combination, a piston having a plurality of piston-ring grooves near its head end and a rigid land between any two adjacent grooves, and a plurality of piston rings in said grooves, including a plain ring nearest the piston-end, said piston and piston rings having a plurality of circumferential oil channels associated with others of said piston rings, one such oil channel having free communication with piston-ring grooves on both sides of it.

5. The method of controlling the oil film between a piston and a cylinder wall, comprising providing a piston ring near the head-end of the piston and a circumferential groove into which said piston ring scrapes oil, providing in the piston surface a superficial reservoir into which said circumferential groove feeds, and varying the dimensions of said reservoir to control said oil film.

6. The method of controlling the oil film between a piston and a cylinder wall, comprising providing a piston ring near the head-end of the piston and a circumferential groove into which said piston ring scrapes oil, providing in the piston surface a superficial reservoir into which said circumferential groove feeds, and varying the circumferential extent of the opening between said groove and said reservoir to control said oil film.

7. In combination, a piston having a piston-ring groove near its head, a piston ring in said piston-ring groove, said piston ring and piston being arranged so that there is a circumferential groove or passageway at that side of the piston ring which is remote from the piston head, and said piston having a superficial reservoir with which said circumferential groove or passageway communicates, the skirt of said piston being provided with one or more slots which approach close to said circumferential groove or passageway and to said superficial reservoir, said piston being provided with a superficial dam separating said slot or slots from said circumferential groove or passageway and said superficial reservoir.

8. In combination, a piston having a piston-ring groove near its head, a piston ring in said piston-ring groove, said piston ring and piston being arranged so that there is a circumferential groove or passageway at that side of the piston ring which is remote from the piston head, and said piston having a reservoir with which said circumferential groove or passageway communicates, the skirt of said piston being provided with one or more slots which approach close to said circumferential groove or passageway, said piston being provided with a superficial dam separating said slot or slots from said circumferential groove or passageway.

In witness whereof, I have hereunto set my hand at Indianapolis, Indiana, this 4th day of January, A. D. one thousand nine hundred and twenty-four.

CHARLES C. HANCH.